_United States Patent Office_ 2,897,236
Patented July 28, 1959

2,897,236

BENZYLIDENE-DIALKYLAMINO-HEXANONES
AND THEIR ACID ADDITION SALTS

Rodney D. Moss, Midland, Mich., assignor to The Dow Chemical Company, Midland, Mich., a corporation of Delaware No Drawing. Application July 25, 1957
Serial No. 674,013

4 Claims. (Cl. 260—570.5)

The present invention relates to hexanones and is more particularly concerned with (1) benzylidene-dialkylaminohexanones having the formula

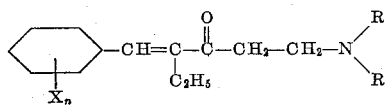

wherein, in this and succeeding formulae, X represents a halogen having an atomic number from 17 to 35, inclusive, $n$ represents an integer from 0 to 5, inclusive, and, each R represents lower alkyl; and, (2) the acid addition salts of said amino-hexanones. The term lower alkyl is employed in the present specification and claims to refer to the alkyl radicals containing from 1 to 4 carbon atoms, inclusive. The symbol

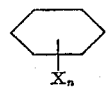

is employed in the present specification and claims to refer to a benzene ring substituted with from zero to 5 chlorine or bromine atoms in various positions on the benzene ring. The new salt compounds are crystalline solids somewhat soluble in many common organic solvents and very soluble in alcohol and water and the new free amines are soluble in many common organic solvents and substantially insoluble in water. They are particularly useful as bactericides and fungicides and are adapted to be employed as active toxic constituents of dust and liquid compositions for the control of many common bacterial and fungal organisms such as *Staphylococcus aureus* and *Aspergillus terrus*.

The new compounds may be prepared by causing an interaction between a 3-benzylidene-2-pentanone, having the formula,

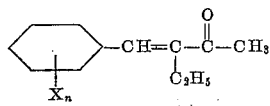

a dialkylamine acid salt such as a hydrobromide, hydrochloride, hydrosulfate or the like, and formaldehyde or a formaldehyde yielding compound such as paraformaldehyde, whereby the dialkylamino group combines with the formaldehyde and the resulting dialkylamino methyl group is substituted for hydrogen on the carbon atom adjacent the carbonyl group of the benzylidene-pentanone. The reaction proceeds smoothly at a temperature of from 60° to 120° C. with the formation of the desired product and water of reaction. Conveniently the reaction may be carried out in the presence of an inert solvent such as ethyl alcohol as the reaction medium. Good results are obtained when employing substantially equimolecular proportions of the reactants.

In carrying out the reaction, a 3-benzylidene-2-pentanone, a dialkylamine acid addition salt such as a dialkylamine hydrobromide, hydrochloride or hydrosulfate, and a formaldehyde-yielding compound are mixed or otherwise blended together and the resulting mixture heated at the reaction temperature for a period of time to complete the reaction. Alternatively, the reactants may be dispersed in an inert solvent such as ethyl alcohol or methyl alcohol. Conveniently, when employing a solvent, the reaction mixture may be heated to the boiling temperature and when so treated is preferably under reflux conditions. Following the completion of the reaction, the reaction mixture may be cooled to room temperature or below to precipitate as a crystalline solid an acid addition salt of the desired product in the reaction mixture. The latter solid may be separated by conventional methods such as filtration or decantation. The acid addition salt of the product may be subsequently purified by recrystallization from a suitable organic solvent.

The free amine may be prepared by neutralizing the acid addition salt, prepared as described above, with caustic soda or other alkali metal or alkaline earth metal hydroxide. The reaction may conveniently be carried out in the presence of water or an inert organic solvent such as ethyl alcohol. Good results are obtained when employing substantially equimolecular proportions of the reactants. The reaction is somewhat exothermic and takes place readily and smoothly at from room temperature to about 100° C. The temperature of reaction conveniently may be controlled by regulating the rate of contacting the reactants and/or by external cooling.

In carrying out the neutralization reaction, a benzylidene-dialkylamino hexanone acid addition salt dissolved in an inert organic solvent is contacted with an aqueous solution of an alkali metal or alkaline earth metal hydroxide. The contacting is carried out with stirring and cooling and at from room temperature to about 100° C. Upon completion of the neutralization, the resulting mixture is diluted with water and the organic layer which forms separated and distilled under reduced pressure to obtain the desired free amine product as an oily liquid.

The following examples illustrate the present invention but are not to be construed as limiting:

*Example 1*

3-benzylidene-2-pentanone (34.8 grams; 0.2 moles), 16.4 grams (0.2 mole) of dimethylamine hydrochloride and 7.0 grams of paraformaldehyde (equivalent to 0.23 mole of formaldehyde) were dispersed in 25 milliliters of absolute ethyl alcohol and the resulting mixture heated at the boiling temperature and under reflux for about one hour. Upon completion of the heating period the reaction mixture was cooled to room temperature and 100 milliliters of ethyl ether added thereto. Following the latter operation the mixture was chilled to about 10° C. whereupon a white crystalline solid precipitated in the mixture. Upon substantial cessation of the formation of the precipitate, the chilled mixture was filtered to separate the precipitate. The precipitate was recrystallized from normal butyl alcohol to obtain a 4-benzylidene-1-dimethylamino-3-hexanone hydrochloride product as a crystalline solid melting at 120–122° C.

*Example 2*

3-(2,4-dichlorobenzylidene)-2-pentanone (48.6 grams; 0.2 mole), 16.4 grams (0.2 mole) of dimethylamine hydrochloride and 7.0 grams of paraformaldehyde (0.23 mole equivalents of formaldehyde) were dispersed in 25 milliliters of absolute ethyl alcohol and the resulting mixture heated to the boiling temperature and under reflux for about one hour. Upon completion of the heating period the reaction mixture was cooled to room temperature and 100 milliliters of ethyl ether added thereto. Following the latter operation the mixture was chilled in an ice bath whereupon a white crystalline solid precipitated in the mixture. Upon substantial cessation of the formation of the precipitate the chilled mixture was filtered to separate the precipitate. The precipitate was recrystallized from normal butyl alchol to obtain a 4 - (2,4 - dichlorobenzylidene) - 1 - dimethylamino-3-hexanone hydrochloride product as a crystalline solid melting at 128–129.5° C.

*Example 3*

3-benzylidene-2-pentanone (34.8 grams; 0.2 mole), 16.4 grams (0.2 mole) of diethylamine hydrochloride and 7.0 grams of paraformaldehyde (0.23 mole equivalents of formaldehyde) are dispersed in absolute methyl alcohol and the resulting mixture heated at the boiling temperature for about one hour. Upon completion of the heating period the reaction mixture is cooled to room temperature and 100 milliliters of ethyl ether added thereto. Following the latter operation, the mixture is chilled to about 10° C. whereupon a white crystalline solid precipitates in the mixture. Upon substantial cessation of the formation of the precipitate, the chilled mixture is filtered to recover the precipitate. The latter is recrystallized from n-propyl alcohol to obtain a 4-benzylidene-1-diethylamino - 3 - hexanone hydrochloride. 4-benzylidene-1-diethylamino-3-hexanone hydrochloride has a molecular weight of 295.5.

*Example 4*

4-benzylidene-1-dimethylamino-3-hexanone hydrochloride (268 grams; 1.0 mole) prepared as described in Example 1 above was neutralized with an aqueous solution of 40 grams (1.0 mole) of sodium hydroxide. The resulting organic layer was separated, washed with water to remove the sodium chloride and dried to obtain a 4-benzylidene-1-dimethylamino-3-hexanone product as a yellow liquid. The product had a specific gravity $d^{25}_{25}$ of 1.0842 at 25° C.

and a refractive index n/D of 1.5462 at 20° C.

In a similar manner other 4-benzylidene-1-dialkylamino-3-hexanones and addition salts may be prepared as follows:

4 - (parachlorobenzylidene) - 1 - dibutylamino-3-hexanone hydrochloride by reacting 3-(parachlorobenzylidene)-2-pentanone, dibutylamine hydrochloride and formaldehyde.

4-(2,4,5-trichlorobenzylidene) - 1 - dimethylamino-3-hexanone hydrobromide by reacting 3-(2,4,5-trichlorobenzylidene)-2-pentanone, dimethylamine hydrobromide and paraformaldehyde.

4-(2,4,5,6-tetrachlorobenzylidene) - 1 - dimethylamino-3-hexanone hydrochloride by reacting 3-(2,4,5,6-tetrachlorobenzylidene)-2-pentanone, dimethylamine hydrochloride and formaldehyde.

4-(2,3,4,5,6 - (pentachlorobenzylidene - 1 - dimethylamino-3-hexanone hydrochloride by reacting 3-(2,3,4,5,6-pentachlorobenzylidene)-2-pentanone, dimethylamine, hydrochloride and paraformaldehyde.

4-(2,4,6-trichlorobenzylidene) - 1 - dipropylamino-3-hexanone hydrosulfate by reacting 3-(2,4,6-trichlorobenzylidene)-2-pentanone, dipropylamine hydrosulfate and paraformaldehyde.

The corresponding 4-benzlidene-1-dialkylamino-3-hexanones may be prepared by neutralizing the above acid addition salts with stoichiometric amounts of an alkali metal or alkaline earth metal hydroxide such as sodium, potassium, calcium or barium hydroxide.

In a similar manner the bromobenzylidene-1-dialkylamono-3-hexanones and their acid addition salts may be prepared employing an anologous procedure. These compounds have substantially the same utility as the chloro compounds.

The new 4-benzylidene-1-dialkylamino-3-hexanones have been tested and found effective as bactericides and fungicides. For such use the products may be dispersed on an inert finely divided solid and employed as dusts. Also, such mixtures may be dispersed in water with or without the aid of a wetting agent, and the resulting aqueous suspensions employed as sprays. In other procedures, the products may be employed as constituents of oil-in-water emulsions, or water dispersions with or without the addition of wetting, dispersing or emulsifying agents. In representative operations, 4-benzyildene-1-dimethylamino-3-hexanone hydrochloride and 4-(2,4-dichlorobenzylidene)-1-dimethylamino-3-hexanone each gave complete inhibition of *Staphylococcus aureus* in a solid nutrient agar culture medium when each such agar medium was saturated with a 0.005 percent by weight acetone solution of one of the compounds and incubated at 30° C. for three days.

The benzlidene-pentanones employed as starting materials in the reaction of the present invention may be prepared by condensing an appropriate benzaldehyde with 2-pentanone in the presence of aqueous or anhydrous hydrochloric acid and at a temperature of from room temperature to 100° C. The desired product may be recovered in conventional manner such as by filtration if the product is a crystalline solid or fractional distillation of a liquid.

I claim:

1. A 4-benzylidene-1-dialkylamino-3-hexanone having the formula

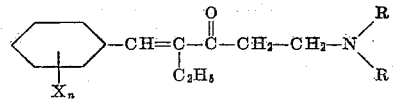

wherein X represents a halogen having the atomic number from 17 to 35, inclusive, n represents an integer from 0 to 5, inclusive, and each R represents lower alkyl; and, the acid addition salts of said hexanone selected from the group consisting of the hydrochloride, the hydrosulfate and the hydrobromide.

2. 4-benzylidene-1-dimethylamino-3-hexanone hydrochloride.

3. 4-(2,4-dichlorobenzylidene) - 1 - dimethylamino-3-hexanone hydrochloride.

4. 4-benzylidene-1-dimethylamino-3-hexanone.

References Cited in the file of this patent

UNITED STATES PATENTS

| | | |
|---|---|---|
| 2,240,965 | Andreas | May 6, 1941 |
| 2,686,808 | Sprague | Aug. 17, 1954 |
| 2,778,853 | Schultz | Jan. 22, 1957 |

OTHER REFERENCES

Adams et al.: Organic Reactions, vol. I, p. 304, John Wiley and Sons, Inc., New York (1942).

Foulds et al.: Journal of the Chemical Society (London), vol. 103, pp. 1768–1770 (1913).